US010221327B2

(12) United States Patent
Drumright et al.

(10) Patent No.: US 10,221,327 B2
(45) Date of Patent: Mar. 5, 2019

(54) WATER BORNE POLYOLEFIN DISPERSION COATINGS, AND METHODS OF MAKING

(71) Applicant: Dow Global Technologies LLC, Midland, MI (US)

(72) Inventors: Ray E. Drumright, Midland, MI (US); Bernhard Kainz, Lauf (DE); Richard A. Lundgard, Midland, MI (US); Cynthia Stants, Coleman, MI (US); Houxiang Tang, Midland, MI (US); Jeffrey Wilbur, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 304 days.

(21) Appl. No.: 15/064,902

(22) Filed: Mar. 9, 2016

(65) Prior Publication Data

US 2016/0280951 A1 Sep. 29, 2016

Related U.S. Application Data

(60) Provisional application No. 62/137,895, filed on Mar. 25, 2015.

(51) Int. Cl.
| | | |
|---|---|---|
| *C09D 5/00* | (2006.01) | |
| *C09D 123/12* | (2006.01) | |
| *C08L 23/08* | (2006.01) | |
| *C08L 23/14* | (2006.01) | |
| *C09D 123/08* | (2006.01) | |
| *C09D 123/10* | (2006.01) | |
| *C09J 123/08* | (2006.01) | |
| *C09J 123/10* | (2006.01) | |
| *C08L 51/06* | (2006.01) | |
| *C09D 7/48* | (2018.01) | |
| *C09D 7/65* | (2018.01) | |
| *C08K 5/134* | (2006.01) | |

(52) U.S. Cl.
CPC ........ *C09D 123/12* (2013.01); *C08L 23/0815* (2013.01); *C08L 23/142* (2013.01); *C08L 51/06* (2013.01); *C09D 5/00* (2013.01); *C09D 7/48* (2018.01); *C09D 7/65* (2018.01); *C09D 123/0815* (2013.01); *C09D 123/10* (2013.01); *C09J 123/0815* (2013.01); *C09J 123/10* (2013.01); *C08K 5/1345* (2013.01); *C08L 2201/08* (2013.01); *C08L 2201/54* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 3,645,992 A | 2/1972 | Dow | |
| 4,076,698 A | 2/1978 | Anderson et al. | |
| 4,599,392 A | 7/1986 | McKinney et al. | |
| 4,988,781 A | 1/1991 | McKinney et al. | |
| 5,272,236 A | 12/1993 | Lai et al. | |
| 5,278,272 A | 1/1994 | Lai et al. | |
| 5,938,437 A | 8/1999 | DeVincenzo | |
| 8,344,884 B2 | 1/2013 | Mercier et al. | |
| 8,394,884 B2 | 3/2013 | Kotori et al. | |
| 8,779,053 B2 | 7/2014 | Lundgard et al. | |
| 2010/0029827 A1* | 2/2010 | Ansems | B32B 27/08 524/451 |
| 2012/0273496 A1* | 11/2012 | Lourido | C08J 3/05 220/359.1 |
| 2013/0130021 A1* | 5/2013 | Lundgard | C09D 123/06 428/336 |
| 2013/0143039 A1* | 6/2013 | Wilbur | C09D 7/1241 428/339 |

(Continued)

FOREIGN PATENT DOCUMENTS

| | | |
|---|---|---|
| GB | 2096159 A | 10/1982 |
| WO | 2011011707 A2 | 1/2011 |
| WO | 2011068525 A1 | 6/2011 |

OTHER PUBLICATIONS

Feyz, et al.; Studying and Increasing Light Stability of Rotomolding Grade of Polyethylene, Facility of Science; pp. 1590-1593, Sep. 2007.

*Primary Examiner* — Robert S Loewe
(74) *Attorney, Agent, or Firm* — Karl E. Stauss; Cantor Colburn LLP

(57) ABSTRACT

The present invention provides aqueous polyolefin dispersion compositions for use in metal coatings, such as can coatings, comprising one or more polyolefin base polymer, one or more at least partially neutralized olefinic stabilizing agent having an acid number (AN) of from 80 to 250, preferably, a polyolefin stabilizing agent, such as an olefin-carboxylic acid copolymer or a blend of two such polymers, an optional coupling agent having an acid number (AN) of from 10 to 70 and a melt index of from 500 to 5,000,000 grams of polymer melt passing in 10 minutes through a heated syringe or cylinder at 190° C. with a plunger loaded with 2.16 kg, preferably, a polymer, and a hindered phenolic antioxidant containing an ester linkage dispersed in the polyolefin dispersion composition. The hindered phenolic antioxidant containing an ester linkage can be masterbatched with a polyolefin base polymer, polyolefin stabilizing agent or a coupling agent which is a polymer, melt mixed with the remaining polyolefin composition and then dispersed with aqueous media and a neutralizing agent to form the aqueous dispersion.

17 Claims, No Drawings

(56) References Cited

U.S. PATENT DOCUMENTS

2016/0160016 A1\* 6/2016 Lundgard ................ C09D 5/00
 524/522
2016/0177075 A1\* 6/2016 Crimmins ............... C08L 23/08
 523/221

\* cited by examiner

WATER BORNE POLYOLEFIN DISPERSION COATINGS, AND METHODS OF MAKING

The present invention relates to aqueous polyolefin dispersion coatings, such as coated metal articles, compositions therefor and methods of making them, the compositions comprising one or more polyolefin base polymer, one or more olefinic stabilizing agent, one or more coupling agent and dispersed therein a hindered phenolic antioxidant containing an ester linkage. More particularly, the present invention relates to methods of making polyolefin dispersions comprising melt blending (i) all of the materials, including the antioxidant or (ii) melt blending all of the materials other than the antioxidant and separately, melt blending the antioxidant into a polyolefin chosen from the polyolefin base polymer, a polyolefin stabilizing agent, the coupling agent or mixtures thereof to make an antioxidant dispersion (particle or pellet) and dispersing all of melt blended materials from (i) or (ii) into an aqueous medium to form the aqueous polyolefin dispersion.

Polyolefin dispersions (PODs) are useful for metal packaging (e.g., beverage and food metal containers, aerosol cans), and general industrial metal coating applications. However, polyolefin materials such as polypropylene and polyethylene are susceptible to thermal degradation at the high temperatures of 170 to 375° C. needed to form the coating. Such thermal degradation is time dependent and is evidenced by deterioration of the coating, as is shown by deterioration of solvent resistance (MEK double rub performance) or by infrared (IR) spectra of the coating showing the growth of peaks due to oxidation products.

U.S. Pat. No. 8,779,053 to Lundgard et al. discloses polyolefin dispersions for metal coating applications. Antioxidants were post added to the coating formulation by dissolving them in co solvents and adding them to the continuous phase of an aqueous dispersion. However, the compositions resulting therefrom did not maintain the desired level of thermal stability for metal coating applications.

The present inventors have endeavored to solve the problem of providing metal coating and compositions therefor that enable provision of a coating or film possessing excellent thermal stability throughout and after processing.

STATEMENT OF THE INVENTION

1. In accordance with the present invention, aqueous polyolefin dispersion compositions comprise as the dispersed phase particles of one or more polyolefin base polymer chosen from a polyolefin, a carboxylic acid functional polyolefin and a carboxylate functional polyolefin, preferably, a polyolefin, from 1 to 40 wt. % or, preferably, from 10 to 25 wt. %, based on the total solids of the polyolefin dispersion composition, of one or more at least partially neutralized olefinic stabilizing agent, preferably, a polyolefin stabilizing agent, from 0 to 50 wt. % or, preferably, from 2 to 30 wt. %, or, more preferably, 5 wt. % or more, based on the total solids of the polyolefin dispersion composition, of one or more coupling agent having an acid number (AN) of from 10 to 70, or, preferably, less than 60 or, preferably, from 35 to 55, and having a melt index of from 500 to 5,000,000, preferably, 1000 or more, grams of polymer melt passing in 10 minutes through a heated syringe or cylinder at 190° C. with a plunger loaded with 2.16 kg, or, alternatively, having a viscosity of from 75 to 10,000, preferably, 150 or higher, mPa·s taken via the DIN 53019 Method (2010) at 140° C. for a polymer wherein more than 50 wt. % of the polymer comprises ethylene in polymerized form and at taken at 170° C. for a polymer wherein more than 50 wt. % of the polymer comprises propylene in polymerized form, preferably, a maleic anhydride grafted polyolefin; and, dispersed in at least one of the polyolefin base polymer, a polyolefin stabilizing agent or the coupling agent which is a polymer, at least one hindered phenolic antioxidant containing an ester linkage.

2. The compositions in accordance with item 1, above, wherein the antioxidant is a phenolic antioxidant comprising at least one hydroxyphenylpropionic acid ester.

3. The compositions in accordance with any of items 1 or 2, above, wherein the antioxidant is benzenepropanoic acid, 3-(1,1-dimethylethyl)-β-[3-(1,1-dimethylethyl)-4-hydroxyphenyl]-4-hydroxy-β-methyl-1,1'-(1,2-ethanediyl) ester.

4. The compositions in accordance with any of items 1, 2 or 3, above, further comprising a second or more antioxidants.

5. The compositions in accordance with any of items 1, 2, 3 or 4, above, wherein the total amount of hindered phenolic antioxidant containing an ester linkage loading ranges from 200 ppm to 10000 ppm, or, preferably, 400 or more, or from 600 to 5,000 ppm or, more preferably, from 800 to 3,000 ppm of total polyolefin dispersion composition solids.

6. The compositions in accordance with any of items 1, 2, 3, 4, or 5, above, wherein the one or more polyolefin base polymer is chosen from a carboxylic acid functional polyolefin and a carboxylate functional polyolefin and has a melt index of from 0.3 to 50 or, preferably, 15 or less grams polymer melt passing in 10 min through a heated syringe or cylinder at 190° C. with a plunger loaded with 2.16 kg for a polymer wherein more than 50 wt. % of the polymer comprises ethylene in polymerized form and at 230° C. and 2.16 kg load for a polymer wherein more than 50 wt. % of the polymer comprises propylene in polymerized form and has an acid number (AN) of from 0.5 to less than 80, or, preferably, from 1 to 20, or, when the composition comprises no coupling agent, preferably, from 45-80.

7. The compositions in accordance with any of items 1, 2, 3, 4, 5, or 6, above, wherein the amount of the one or more at least partially neutralized olefinic stabilizing agent has an acid number (AN) of from 80 to 250, or, preferably, 100 or more, or, preferably, up to 200, and wherein the polyolefin dispersion composition comprises carboxylic acid groups that are from 50 to 300% neutralized or, preferably, from 70 to 200% neutralized with a base, preferably a volatile amine, or, more preferably, a volatile tertiary amine.

8. The compositions in accordance with any of items 1, 2, 3, 4, 5, 6, or 7 above, wherein the one or more at least partially neutralized olefinic stabilizing agent comprises an olefin-carboxylic acid copolymer, preferably, ethylene acrylic acid (EAA) or ethylene methacrylic acid (EMAA).

9. The compositions in accordance with any of items 1, 2, 3, 4, 5, 7 or 8, above, wherein the one or more polyolefin base polymer is a polyolefin chosen from polyethylene, polypropylene, poly(alpha-olefin) copolymers, such as poly (ethylene propylene), poly(ethylene butene), or poly(ethylene octene), poly(alpha-olefin) terpolymers, such as EPDM, and blends of any of these.

10. In accordance with another aspect of the present invention, coatings comprise a substrate having thereon one or more layer or film of a polyolefin dispersion composition of one or more polyolefin base polymer chosen from a polyolefin, a carboxylic acid functional polyolefin and a carboxylate functional polyolefin, from 1 to 40 wt. % or, preferably, from 10 to 25 wt. %, based on the total solids of the polyolefin dispersion composition, of one or more olefinic stabilizing agent having an acid number (AN) of from 80 to 250 or, preferably, 100 or more, or, preferably, up to 200, from 0 to 50 wt. % or, preferably, from 2 to 30 wt. %, or, more preferably, 5 wt. % or more, based on the total solids of the polyolefin dispersion composition, of one or more coupling agent having an acid number (AN) of from 10 to 70, less than 60 or, preferably, from 35 to 55 and having a melt index of from 500 to 5,000,000, preferably, 1000 or more, grams of polymer melt passing in 10 minutes through a heated syringe or cylinder at 190° C. with a plunger loaded with 2.16 kg, or, alternatively, having a viscosity of from 75 to 10,000, preferably, 150 or higher, mPa·s taken via the DIN 53019 method (2010) measured at 140° C. for a polymer wherein more than 50 wt. % of the polymer comprises ethylene in polymerized form and measured at 170° C. for a polymer wherein more than 50 wt. % of the polymer comprises propylene in polymerized form, preferably, a maleic anhydride grafted polyolefin; and, dispersed in the polyolefin dispersion composition at least one hindered phenolic antioxidant containing an ester linkage.

11. The coatings in accordance with item 10, above, wherein the hindered phenolic antioxidant comprises at least one hydroxyphenylpropionic acid ester, preferably, benzenepropanoic acid, 3-(1,1-dimethylethyl)-β-[3-(1,1-dimethylethyl)-4-hydroxyphenyl]-4-hydroxy-β-methyl-1,1'-(1,2-ethanediyl) ester or a combination thereof with one or more second antioxidant, such as a hindered phenolic antioxidant.

12. The coatings in accordance with any of items 10 or 11, above, wherein the total amount of hindered phenolic antioxidant containing an ester linkage loading ranges from 200 ppm to 10000 ppm, or, preferably, from 600 to 5,000 ppm or, more preferably, from 800 to 3,000 ppm of the total polyolefin dispersion composition solids.

13. The coatings in accordance with any of items 10, 11 or 12, above, wherein the amount of the one or more olefinic stabilizing agent comprises an olefin-carboxylic acid copolymer, preferably, ethylene acrylic acid (EAA) or ethylene methacrylic acid (EMAA).

14. The coatings in accordance with any of items 10, 11, 12, or 13, above, wherein the one or more polyolefin base polymer comprises polyethylene, polypropylene, poly(alpha-olefin) copolymers, poly(alpha-olefin) terpolymers, and blends of any of these.

15. The coatings in accordance with any of 10, 11, 12, 13, or 14, above, wherein the substrate is metal, or, preferably, any of metal containers, lids and closures, or, more preferably, any of metal containers, or lids and closures for food or beverage.

16. The coatings in accordance with any of 10, 11, 12, 13, 14, or 15, above, wherein a coating having a thickness of 10 microns exhibits a methyl ethyl ketone double rub resistance of 100 double rubs or more, or, preferably, 150 or more or, more preferably, 200 or above until the coating is cut through and the substrate becomes visible in any area according to ASTM D 5402-06, Method 3 (2011), using bleached cheese cloth (Grade 50) having 28×24 threads per 2.54 cm×2.54 cm square and a 906 g (32 ounce) ball peen hammer, wherein the cloth is fastened with a wire to the flat end of the hammer and rubbed against the coating back and forth across the coating, the cloth being re-dipped into MEK every 25 double rubs.

17. In accordance with another aspect of the present invention, methods of making the compositions of any of 1 to 9 above, comprise melt blending i) the hindered phenolic antioxidant, the polyolefin base polymer, the olefinic stabilizing agent, and the coupling agent, if any, or (ii) melt blending (a) the polyolefin base polymer, coupling agent, if any, and olefinic stabilizing agent and (b), separately, melt blending the hindered phenolic antioxidant containing an ester linkage in any of a polyolefin base polymer, polyolefin stabilizing agent or coupling agent which is a polymer to form an antioxidant dispersion, followed by dispersing the melt of (i), or both the melts (ii) (a) and (b) in water along with the desired amount of one or more volatile base using dispersion equipment, preferably, an extruder or continuous high shear mixer, to form an aqueous dispersion composition.

18. In accordance with yet another aspect of the present invention, methods of making the coatings of any of 10 to 16 above, comprise applying to a metal substrate an aqueous polyolefin dispersion composition of dispersed phase particles of one or more polyolefin base polymer chosen from a polyolefin, a carboxylic acid functional polyolefin and a carboxylate functional polyolefin, from 1 to 40 wt. % or, preferably, from 10 to 25 wt. %, based on the total solids of the polyolefin base polymer, of one or more at least partially neutralized olefinic stabilizing agent, preferably, a polyolefin stabilizing agent, having an acid number (AN) of from 80 and up to 250, or, preferably, from 100 to 200, from 0 to 50 wt. % or, preferably, from 2 to 30 wt. %, or, more preferably, 5 wt. % or more, based on the total solids of the polyolefin dispersion composition, of one or more coupling agent, preferably, having an acid number (AN) of from 10 to 70, less than 60 or, from 35 to 55 and having a melt index of from 500 to 5,000,000, preferably, 1000 or more, grams of polymer melt passing in 10 minutes through a heated syringe or cylinder at 190° C. with a plunger loaded with 2.16 kg, or, alternatively, having a viscosity of from 75 to 10,000, preferably, 150 or higher, mPa·s taken via the DIN 53019 Method (2010) measured at 140° C. for a polymer wherein more than 50 wt. % of the polymer comprises ethylene in polymerized form and measured at 170° C. for a polymer wherein more than 50 wt. % of the polymer comprises propylene in polymerized form, preferably, a maleic anhydride grafted polyolefin, and having a hindered phenolic antioxidant containing an ester linkage dispersed in the polyolefin dispersion composition; and, heating the thus applied composition to form a coating, for example, at from 170 to 375° C., or, preferably, from 180 to 260° C., preferably, for example, flash curing at from 230 to 260° C. for a period of from 5 sec to 2 min.

Unless otherwise indicated, all temperature and pressure units are room temperature and standard pressure (STP).

All phrases comprising parentheses denote either or both of the included parenthetical matter and its absence. For example, the phrase "(meth)acrylate" includes, in the alternative, acrylate and methacrylate.

All ranges recited are inclusive and combinable. For example, a disclosure of acid number (AN) of from 10 to 70, less than 60 or, preferably, from 35 to 55, will include an AN of from 10 to 70, an AN of from 10 to 60, an AN of from 60 to 70, an AN of from 10 to 35, an AN of from 10 to 55, an AN of 35 to 60, an AN of from 35 to 70, and AN of from 55 to 60, an AN of from 55 to 70, an AN of from 60 to 70, or, preferably, an AN of from 35 to 55.

As used herein, the term "Acid Number or AN" means the quantity as the amount of KOH in mg KOH/g polymer required to neutralize acid functionality when measured by titration and is measured according to ASTM D-1386 (2010).

As used herein, the term "ASTM" refers to publications of ASTM International, West Conshohocken, Pa.

As used herein, the term "Differential Scanning calorimetry or DSC" experiments to measure melting temperature, crystallization temperature, and enthalpy are carried out according to ASTM D-3418 (2012).

As used herein the term "DIN" refers to a German language materials specification, published by Beuth Verlag GmbH, Berlin, Del. (Alleinverkauf).

As used herein, unless otherwise specified, the term "Melt index" means the value determined according to ASTM D-1238 (2013). Melt index values are defined as the amount of polymer melt passing in dg/min (or g/10 min) through a heated syringe with a plunger load at 190° C. and 2.16 kg load for polyethylene polymers where more than 50 wt. % of the copolymer comprises ethylene in polymerized form, and at 230° C. and 2.16 kg load for polypropylene polymers if more than 50 wt. % of the copolymer comprises propylene in polymerized form.

As used herein, the term "melting point" means the value determined by DSC method using a ramp rate of 10° C./min.

As used herein, the term "solids" or "total solids" refers to the wt. % in compositions of solids of the one or more polyolefin base polymers, the one or more olefinic stabilizing agents, one or more coupling agents and one or more antioxidants, and, when present, pigments, fillers or extenders and any additives that are not volatile under use conditions for the compositions of the present invention. For example, water, additives such as coalescents and solvents or bases, like ammonia or lower alkyl amines that volatilize under use conditions of the compositions of the present invention are not considered solids. The solids value is measured according to a modified ASTM D2369 method (2011) using an OHAUS moisture analyzer with the drying temperature set at 150° C.

As used herein, the term "volatile base" means a base that volatilizes at standard pressure at a temperature of from room temperature to 250° C.

As used herein, the term "wt. %" refers to weight percent.

The compositions of the present invention are useful for making coatings for metal containers such as beverage and food cans that meet food contact compliance requirements and do not contain intentionally added bisphenol A. In accordance with the present invention, compositions and coatings comprise polyolefin base polymer compositions of hindered phenolic antioxidants dispersed in an aqueous polyolefin dispersion composition, i.e., in or with a polymeric phase, especially hindered phenolic antioxidants containing an ester linkage. The polymer melt blending of antioxidant provides aqueous polyolefin dispersions wherein the antioxidant is incorporated in the dispersed phase. This enables more efficient use of less antioxidant for food contacting coatings and avoids the phase instability that results when the antioxidant is added to the compositions by dissolving in co-solvents or other known methods. Also, for metal coating applications requiring high temperature curing, such as beverage and food can coatings, the aqueous polyolefin dispersions and coatings therefrom exhibit the needed thermal stability to withstand process temperatures in excess of 200° C. Through appropriate processing steps and selecting antioxidant (AO) chemistry, the present invention provides a novel way of preparing the dispersion improving thermal stability of coatings from polyolefin dispersions for metal coating applications that require high temperature curing.

The polyolefin base polymers may comprise any polyolefin that will form a film under the curing conditions to make a coating in accordance with the present invention. Generally, these are chosen from a polyolefin, a carboxylic acid functional polyolefin and a carboxylate functional polyolefin.

Suitable polyolefins may be chosen from one or more polyethylene, polypropylene, poly(alpha-olefin) copolymers, poly(alpha-olefin) terpolymers, and blends of any of these.

Suitable polyolefin base polymers may be any having a melting point of at least 60° C. or at least 90° C., or 100° C. or more, or 125° C. or more. Such polymers may include high density polyethylene (HDPE), polypropylene, ethylene-propylene copolymers, ethylene-butene copolymers, ethylene-hexene copolymers, ethylene-octene copolymers, ethylene-ethyl acrylate copolymers, ethylene-propylene-ethylidinenorbornene terpolymers, olefin block copolymers, such as ethylene-propylene and ethylene-octene block copolymers, and acid modified polyolefin having a melt index of from 0.3 to 50 or, preferably, 15 or less, grams polymer melt passing in 10 min through a heated syringe with a plunger load at 190° C. and 2.16 kg load for a polymer wherein more than 50 wt. % of the polymer comprises ethylene in polymerized form and at 230° C. and 2.16 kg load for a polymer wherein more than 50 wt. % of the polymer comprises propylene in polymerized form, and having an acid number (AN) of from 0.5 to less than 80, or, preferably, from 1 to 20, or, when the composition comprises no coupling agent, preferably, from 45-80.

Suitable polyethylenes can be chosen from polyethylene, an ethylene-copolymer, ethylene-propylene-diene terpolymers and a combination thereof. Exemplary ethylene polymers can also include homogeneous polymers, as for example described in U.S. Pat. No. 3,645,992; high density polyethylene (HDPE), as for example described in U.S. Pat. No. 4,076,698; heterogeneously branched linear low density polyethylene (LLDPE); heterogeneously branched ultra-low linear density polyethylene (ULDPE); homogeneously branched, linear ethylene/propylene or ethylene/alpha-olefin copolymers; homogeneously branched, substantially linear ethylene/propylene or ethylene/alpha-olefin copolymers, which can be prepared, for example, by processes disclosed in U.S. Pat. Nos. 5,272,236 and 5,278,272; and high pressure free radical polymerized ethylene polymers and copolymers, such as low density polyethylene (LDPE).

Other examples of suitable polymers include, but are not limited to, alpha-polyolefin copolymers, such as ethylene ethyl acrylate copolymers, ethylene methyl acrylates, ethylene butyl acrylates; ethylene-$C_4$ to $C_{12}$ olefin copolymers, such as ethylene-butene, ethylene-hexene or ethylene octene copolymers; ethylene-propylene-butene terpolymers; and combinations thereof.

The polyolefin base polymer can include units derived from polymerization of propylene and polymeric units derived from polymerization of one or more alpha-olefin comonomers. Examples of suitable comonomers are $C_2$, and $C_4$ to $C_{10}$ alpha-olefins; for example, $C_2$, $C_4$, $C_6$ and $C_8$ alpha-olefins. The polyolefin base polymer can include from 1 to 40 wt. % of units derived from one or more alpha-olefin comonomers, for example, from 3 wt. %, or from 7 wt. % to 35 wt. %, or 20 wt. %. For example, the base polymer can comprise from 1 to 35 percent by weight of units derived from one or more alpha-olefin comonomers.

The polyolefin base polymer can include from 60 to 100, preferably, from 80 and 99, or, more preferably from 85 to 99 wt. % of units derived from polymerization, on one hand of ethylene, e.g., high density polyethylene, or propylene, and, on the other hand, the remaining units derived from polymerization of at least one other alpha-olefin.

The polyolefin base polymer can have a density greater than 0.88 grams per cubic centimeter (g/cm$^3$). For example, the base polymer comprising the polyolefin can have a density in a range from 0.88 to 1.1 g/cm$^3$, 0.89 to 1.0 g/cm$^3$, 0.90 to 0.98 g/cm$^3$, or 0.91 to 0.97 g/cm$^3$. For example, the polyolefin base polymer can comprise polypropylene high density polyethylene, medium density polyethylene, low density polyethylene, or combinations thereof. As used herein, "high density polyethylene" refers to polyethylene having a density in a range from 0.93 to 0.97 grams per cubic centimeter (g/cm$^3$).

Available polyethylenes and alpha-polyolefin copolymers include, but are not limited to, polymers available as VERSIFY™ DP-4000.01; VERSIFY™ 4200, VERSIFY™ 4000, VERSIFY™ 3200, VERSIFY™ 3000, and VERSIFY™ 3300 polymers (The Dow Chemical Company, Midland, Mich.), ENGAGE™ 8407 polymer (Dow), INFUSE™ 9807 polymer (Dow); VISTAMAXX™ propylene-containing elastomers (ExxonMobil Chemical, Houston, Tex.); commercially available high density polyethylenes such as, but are not limited to, DMDA 8940 NT 7 (Melt Index 44, Density 0.951), DMDA-8007 NT 7 (Melt Index 8.3, Density 0.965), DMDC-8910 NT 7 (Melt Index 10, Density 0.943), DMDA-1210 NT 7 (Melt Index 10, Density 0.952), HDPE 17450N (Melt Index 17, Density 0.950), DMDA-8920 NT 7 (Melt Index 20, Density 0.954), DMDA 8940 NT 7 (Melt Index 44, Density 0.951), DMDA-8950 NT 7 (Melt Index 50, Density 0.942), DMDA-8965-NT 7 (Melt Index 66, Density 0.952), DMDA-8940 HDPE (Melt Index of approximately 40-48 g/10 min), all from the Dow Chemical Company.

Suitable polypropylenes useful as a polyolefin base polymer can include, but are not limited to, 6D43 Polypropylene (Braskem, Philadelphia, Pa.).

Examples of commercially available carboxylic acid functional polyolefin base polymers may include, for example, maleic anhydride functionalized polyethylene include those available under the tradename AMPLIFY™ (The Dow Chemical Company, Midland, Mich.), such as AMPLIFY™ GR-204 polymer, among others. Amplify™ GR-204 is 2,5-furandione modified ethylene/hexene-1 polymer.

Suitable olefinic stabilizing agents may be, for example, any partially or fully neutralized copolymers of alpha-olefin and any carboxylic acid, salt or anhydride group containing monomers with an unsaturated bond which have an AN of 80 or more, or 110 or more, or, 140 or more and up to 250, such as ethylene acrylic acid copolymer, ethylene methacrylic acid copolymer and/or acid modified polyolefin such as maleic anhydride grafted polyolefin, and/or blends thereof.

Suitable olefinic stabilizing agents may also include, for example, a long chain linear carboxylic acid having from 14 to 45 carbons, preferably, from 16 to 36 carbons, such as a linear fatty acid, for example, a Unicid™ 350 dispersing agent or behenic (C$_{22}$) acid.

The olefinic stabilizing agent of the present invention can include one or more polar polyolefins, e.g., having a polar group as either a comonomer or grafted monomer.

The olefinic stabilizing agent can include, but is not limited to, amphiphilic copolymer compositions, the copolymer including the reaction product of from 5 to 95 wt. % of one or more acid functional monomers and from 5 to 95 wt. % of one or more copolymerizable ethylenically unsaturated hydrophobic monomers, such as an alpha olefin. These materials can be water soluble and/or emulsifiable, for example upon neutralization and can act as colloidal stabilizers.

Acid-functional monomers useful for production of the olefinic stabilizing agent compositions include, but are not limited to, ethylenically unsaturated monomers containing carboxylic acid, phosphonic acid, phosphinic acid, sulfonic acid, sulfonic acid groups, and anhydrides that are subsequently hydrolyzed. Suitable examples include (meth) acrylic acid, maleic acid, fumaric acid, itaconic acid, vinyl phosphonic acid, phosphoethyl(meth)acrylate, and vinylsulfonic acid.

The olefinic stabilizing agent may be any partially or fully neutralized acid functional olefin copolymer dispersing agents, such as carboxylic acid functional olefin copolymers like ethylene/(meth)acrylic acid copolymers like those available as Nucrel™ (DuPont), or Escor™ (ExxonMobil) polymers.

The olefinic stabilizing agent can include an internal surfactants. Internal surfactants are surfactants that do become chemically reacted into the polyolefin during dispersion preparation.

The olefinic stabilizing agent of the present invention is at least partially neutralized with a neutralizing agent. Examples of the neutralizing agent include, but are not limited to, metal hydroxides, carbonates, amines, and combinations thereof, preferably, amines, and, more preferably, volatile amines that are not a primary amine, e.g., not ammonia, and are secondary or tertiary amines.

The acid functionality in the olefinic stabilizing agent of the present invention is neutralized in the range of from 50% to 300%, or, preferably 70 to 200%. If the acid functionality is not adequately neutralized, the aqueous polyolefin dispersion particle size becomes too large. As used herein, the term "% neutralized" refers to the mole % of acid groups in all of the polyolefin dispersion composition.

Examples of olefinic stabilizing agents include, but are not limited to, at least partially neutralized ethylene-acrylic acid and ethylene-methacrylic acid copolymers comprising from 12 to 25 wt. % of the acid group containing comonomers, based on the total weight of monomers used to make the olefin containing dispersing agent. Examples of such olefin containing dispersing agents include those available under the trademarks PRIMACOR™, such as PRIMACOR™ 5980i or PRIMACOR™ 5990i, both commercially available from The Dow Chemical Company; NUCREL™ polymer (E.I. DuPont de Nemours, Wilmington, Del.); and ESCOR™ polymer (ExxonMobil Chemical Company) and described in U.S. Pat. Nos. 4,599,392, 4,988,781, and 5,938, 437.

The coupling agents of the present invention can include any material having the desired acid number (AN) and the desired melt index of from 500 to 5,000,000, preferably, 1000 or more, grams of polymer melt passing in 10 minutes through a heated syringe or cylinder at 190° C. with a plunger loaded with 2.16 kg, or, alternatively, having a viscosity of from 75 to 10,000, preferably, 150 or higher, mPa·s taken via the DIN 53019 Method (2010) at 140° C. for a polymer wherein more than 50 wt. % of the polymer comprises ethylene in polymerized form and at taken at 170° C. for a polymer wherein more than 50 wt. % of the polymer comprises propylene in polymerized form that can improve compatibility between the polyolefin base polymer and the olefinic stabilizing agent of the present invention. The Melt index of the coupling agents will be significantly higher than the corresponding measure for both the polyolefin base polymer and any polyolefin stabilizing agent, and may be so high that viscosity may be a better practical measure to define the coupling agent.

Suitable polymeric coupling agents may comprise an acid functional modified polyolefin, preferably, a maleic anhydride polyolefin copolymer, maleic anhydride grafted polyolefin, or a maleic anhydride modified polyethylene wax, or a maleic anhydride modified polypropylene wax.

The coupling agent can be any modified polyolefin having an acid number of from 10 to 70, less than 60 or, 35-55 and a melt index of from 500 to 5,000,000, preferably, 1000 or more, grams of polymer melt passing in 10 minutes through a heated syringe or cylinder at 190° C. with a plunger loaded with 2.16 kg, or, alternatively, having a viscosity of from 75 to 10,000, preferably, 150 or higher, mPa·s taken via the DIN 53019 method (2010) measured at 140° C. for a polymer wherein more than 50 wt. % of the polymer comprises ethylene in polymerized form and measured at 170° C. for a polymer wherein more than 50 wt. % of the polymer comprises propylene in polymerized form.

The polymeric coupling agents of the present invention may include acid or anhydride modified polyolefin. For example, coupling agents can be selected from the group consisting of an acid functionalized polypropylene, an acid functionalized polyethylene homopolymer, a copolymer that has been modified with carboxylic acid groups, a copolymer that has been modified with anhydride groups and a combination thereof.

Other suitable coupling agents can include modified polyolefin graft copolymers and/or block copolymers, such as propylene-maleic anhydride graft copolymers.

Specific examples of modified polyolefins useful as coupling agents may include, for example, maleic anhydride functionalized polyethylenes, polypropylenes, copolymers of ethylene and propylene and combinations thereof. Examples include, but are not limited to maleic anhydride functionalized polyethylene, such as high density polyethylene, maleic anhydride functionalized polyethylene copolymers, terpolymers and blends may also be used. Maleic anhydride functionality can be incorporated into the polymer by grafting or other reaction methods. When grafting, the level of carboxylic acid incorporation is below 10 wt. %, such as less than 5 wt. %, based on the weight of the polymer.

Commercially available examples of suitable modified polyolefins include, but are not limited to, the polymers sold under the trade name LICOCENE™, or LICOLUBE™, from Clariant Corporation (Fair Lawn, N.J.), such as LICOCENE™ 6452 (e.g., LICOCENE™ PP MA 6452) and LICOCENE™ 4351 (e.g., LICOCENE™ PE MA 4351), the polymers sold under the trade name A-C™ Performance Additives (Honeywell Corporation, Morristown, N.J.) such as AC575™ which is an ethylene maleic anhydride copolymer, and AC-392™ and AC-395™ which are high density oxidized polyethylene; and EPOLENE™ polymers (Westlake Chemical Company, Houston, Tex.).

A second phenolic antioxidant can be used in addition to the hindered phenolic antioxidant containing an ester linkage, for example, pentaerythritol tetrakis(3-(3,5-di-tert-butyl-4-hydroxyphenyl)propionate, which is commercially available, such as IRGANOX™ 1010, available from BASF.

Any melt mixing device, such as a single screw extruder or melt reactor, can be used to make the antioxidant dispersion of the present invention, which is a solid dispersion as a particle, powder or pellet.

Preferably, the hindered phenolic antioxidant is melt blended into the component at as low a temperature as possible, such as from 100 to 150° C., preferably, 130° C. or less and for the shortest blend time possible, such as from 1 to 30 minutes, or, preferably, from 1 to 10 minutes or less.

Examples of suitable bases include a volatile base. Examples of a volatile base include, but are not limited to, N,N-dimethylethanolamine, ammonia, hydrazine, methylamine, ethylamine, diethylamine, triethylamine, isobutylamine, N,N-diisopropylethylamine, morpholine, piperazine, ethylenediamine, and 1,4-diazabicyclo[2.2.2]octane). The acid groups revert to the acid form upon volatilization of the base, such as in the formation of the coating layer where it can help to promote adhesion of the coating layer to the surface of the substrate.

Amines with boiling points below 250° C. may be used as bases. Other suitable bases can include, for example, an amine such as monoethanolamine, or 2-amino-2-methyl-1-propanol (AMP). Amines useful in embodiments disclosed herein may include diethanolamine, triethanolamine, and TRIS AMINO™ base (Angus, Buffalo Grove, Ill.) NEUTROL™ TE bases (BASF, Leverkusen, Del.), as well as triisopropanolamine and diisopropanolamine (The Dow Chemical Company). Other useful amines may include dimethylamine, trimethylamine, mono-n-propylamine, butylamine, dibutylamine, tributylamine, dimethyl benzyl amine, dimethyl n-propylamine, N-methanol amine, N-aminoethylethanolamine, N-methyl diethanolamine, monoisopropanolamine, N,N-dimethyl propanolamine, 2-amino-2-methyl-1-propanol, 1,2-diaminopropane, tris(hydroxymethyl)-aminomethane, ethylenediamine, N,N,N'N'-tetrakis(2-hydroxylpropyl)ethylenediamine, 3-methoxypropyl amine, imino bis-propyl amine, and the like.

Mixtures of amines may be used.

The base may be an oligomeric amine, e.g., diethylene triamine.

Other suitable examples of neutralizing agents include hydroxides such as, for example, potassium hydroxide, lithium hydroxide, and sodium hydroxide. Examples of carbonates include, but are not limited to sodium carbonate, sodium bicarbonate, potassium carbonate, and calcium carbonate.

The aqueous phase of the polyolefin dispersion compositions may be, for example, water; or in the alternative, the aqueous phase may be a mixture of a major part water and a minor part of one or more organic solvents, e.g., one or more water miscible solvents. The polyolefin dispersion composition of the present invention, independently include 15 to 90 wt. % of the aqueous phase, based on the total weight of the composition. For example, the aqueous phase content may be in the range of from 30 to 90, or from 35 to 85, or from 40 to 75 wt. %, based on the total weight of the composition.

The aqueous polyolefin dispersion compositions of the present invention may have a pH in a range from 8 to 12.

The aqueous polyolefin dispersion compositions of the present invention may optionally be blended during or after processing with one or more cross-linkers such as hydroxyalkylamides, like those available as PRIMID™ (EMS-Chemie AG, Domat/Ems, CH), epoxy functional materials, polyisocyanates, water dispersible or water soluble phenolic resins, water dispersible aminoplast resins, or those described in PCT Pub. No. WO/2011/011707. These cross-linkers may be organic, or inorganic (i.e., zinc nanoparticles) in nature.

The compositions of the present invention may also be optionally be blended during or after processing with one or more additive or auxiliary polymer, such as one or more of an acrylic emulsion polymer, vinyl acrylic emulsion polymer, styrene acrylic emulsion polymer, vinyl acetate ethylene emulsion polymer, epoxy resins, polyester resins, polyurethane resins, polyamide resins and copolymers thereof of and combinations thereof; one or more fillers; one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; one or more lubricants such as fatty acid ester wax, silicon-containing wax, fluorine-containing wax, polyethylene or any other similar polyolefin wax, carnauba wax, lanolin wax or the like; one or more corrosion inhibitors such as aluminum, and zinc; one or more pigments, e.g., titanium dioxide, barium sulfate, mica, calcium carbonate, silica, zinc oxide, milled glass, aluminum trihydrate, talc, antimony trioxide, fly ash, and clay or the like; one or more co-solvents, e.g., glycols, glycol ether, 2,2,4-trimethyl-1,3-pentanediol monoisobutyrate, alcohols, mineral spirits, aromatic solvents and benzoate esters or the like; one or more dispersants, e.g., aminoalcohols, and polycarboxylates; one or more surfactants; one or more preservatives, e.g., biocides, mildewcides, fungicides, algaecides, and combinations thereof; one or more thickeners, e.g., cellulosic containing thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or one or more additional neutralizing agents, e.g., hydroxides, amines, ammonia, and carbonates; optionally one or more solvents or coalescing agents.

In addition, the compositions of the present invention may be blended with one or more additional dispersions, emulsions, suspensions, colloidal suspensions, and the like.

The compositions of the present invention can be formed by any number of methods recognized by those having skill in the art.

The methods of making any polyolefin dispersion compositions comprise melt blending i) the hindered phenolic antioxidant, the polyolefin base polymer, the olefinic stabilizing agent, and the coupling agent, if any, or (ii) (a) the polyolefin base polymer, any coupling agent, olefinic stabilizing agent and (b), separately, the hindered phenolic antioxidant containing an ester linkage in any of a polyolefin base polymer, polyolefin stabilizing agent or coupling agent which is a polymer to form an antioxidant dispersion, followed by dispersing the melt of (i) or the melts of (ii) (a) and (b), preferably both melts (ii) (a) and (b) together, in water along with the desired amount of one or more volatile base using dispersion equipment, preferably, an extruder or homogenizer or high shear mixer, to form an aqueous dispersion composition.

The dispersion equipment can be operated in batch, semi-batch, or continuous mode. Examples of mixers used in the dispersion include rotor-stator, microfluidizer, high pressure homogenizer, ultrasonic, impinging jet, Cowles blade, planetary mixers, and melt kneading devices such as extruders.

Antioxidant dispersions of the present invention can be formed by melt blending the hindered phenolic antioxidant and any thermoplastic polymeric component in the composition of the present invention, preferably, one or more polyolefin stabilizing agent or coupling agent which is a polymer, separately from formation of a melt blend of the polyolefin base polymer, olefinic stabilizing agent and any coupling agent.

For example, a melt blend of (i) the one or more polyolefin base polymers, the coupling agents, the one or more olefinic stabilizing agents, and the hindered phenolic antioxidant of the present invention, may formed by melt-kneading together in an extruder along with the aqueous phase (e.g., water) and any suitable one or more volatile base to form an antioxidant dispersion in situ with the aqueous polyolefin dispersion of the present invention.

For example, (ii) (a) the one or more polyolefin base polymers, the coupling agent coupling agents, the one or more olefinic stabilizing agents, and any one or more volatile base may be melt-kneaded in an extruder to form a melt polyolefin dispersion and, separately, (b) the hindered phenolic antioxidant of the present invention and any one or more polymer chosen from the polyolefin base polymer, the coupling agent which is a polymer, a polyolefin stabilizing agent or their combination may be melt-kneaded in an extruder to form a melt antioxidant dispersion, followed by combining (a) and (b), along with the aqueous phase any one or more volatile base (e.g., water) to form the aqueous polyolefin dispersion composition.

Preferably, the materials (i) together or (ii) (a) and (b), separately, can first be compounded without the volatile base or the aqueous phase, and then melt-kneaded in an extruder in the presence of the aqueous phase (e.g., water), and the volatile base, thereby forming an aqueous dispersion composition.

The dispersion may first be diluted to contain 1 to 20 wt. %, e.g., 1 to 5 wt. % or 1 to 3 wt. %, of the aqueous phase and then, subsequently, further diluted to comprise greater than 25 wt. % of the aqueous phase.

Further dilution may be accomplished via water and/or a solvent as provided herein.

Melt-kneading devices known in the art may be used. For example, a kneader, a BANBURY mixer, single-screw extruder, or a multi-screw extruder, e.g., a twin screw extruder, is used. One example of a suitable extruder system is provided in PCT publication WO 2011/068525 entitled "Extruder Screw".

A process for producing the composition in accordance with the present invention is not particularly limited. For example, an extruder, in certain embodiments, for example, a twin screw extruder, is coupled to a back pressure regulator, melt pump, or gear pump. Exemplary embodiments also provide a volatile base or neutralizing agent reservoir (base reservoir) and an initial aqueous phase reservoir, each of which includes a pump. Desired amounts of volatile base and initial aqueous phase are provided from the base reservoir and the initial aqueous phase reservoir, respectively. Any suitable pump may be used, for example, a pump that provides a flow of 150 cubic centimeters per minute (cc/min) at a pressure of 240 bar can be used to provide the base and the initial aqueous phase to the extruder. Or, a liquid injection pump provides a flow of 300 cc/min at 200 bar or 600 cc/min at 133 bar.

To improve dispersibility, the volatile base or neutralizing agent and initial aqueous phase may be preheated in a preheater.

Any polyolefin base polymer, in the form of pellets, powder, or flakes, may be fed from the feeder to an inlet of the extruder where the base polymer is melted or compounded.

Any masterbatch or antioxidant dispersion of polyolefin base polymer, a polyolefin stabilizing agent or coupling agent which is a polymer, e.g., modified polyolefin, containing hindered phenolic antioxidant can be fed simultaneously with the polyolefin base polymer and an olefinic stabilizing agent and any coupling agent into the extruder via a feeder or gear pump.

A polyolefin stabilizing agent and, if desired, a coupling agent can be compounded into the polyolefin base polymer, and then fed into the extruder via the feeder.

In one method, the polyolefin stabilizing agent can be metered via an inlet prior to the emulsification zone into the molten compound including the polyolefin base polymer.

Thus, the polyolefin stabilizing agent can be added with the polyolefin base polymer or they can be provided separately to the extruder. The polymer melt is then delivered from the mix and convey zone to an emulsification zone of the extruder where the initial amount of aqueous phase and base from the aqueous phase and base reservoirs are added through an inlet.

In making any polyolefin dispersion, the one or more coupling agent can be added additionally or exclusively to the aqueous phase stream.

Further fluid media may be added via aqueous phase inlet from aqueous phase reservoir in a dilution and cooling zone of the extruder. Typically, the dispersion is diluted to at least 30 wt. % aqueous phase in the cooling zone to form a diluted mixture. In addition, the diluted mixture may be diluted any number of times until the desired dilution level is achieved.

Any dispersion may further be cooled after exiting the extruder or mixing device by the use of a suitable heat exchanger.

To reduce vapor pressure (e.g., steam pressure) build-up in the extruder and form a polyolefin dispersion in a secondary mixing device such as a rotor stator mixer, the aqueous phase is not added into the extruder but rather to a stream containing the melt after the melt has exited from the extruder and enters the secondary mixing device.

The compositions of the present invention can be formed in a continuous high shear mixer without the use of a melt kneading extruder. Thus, a first stream including one or more liquid or molten polymers is supplied to a continuous high shear mixer from a suitable liquid pump for example, a syringe pump, gear pump, or progressive cavity pump. The first stream is flowed through a first conduit and merged continuously with a second stream containing aqueous phase that is flowed through a second conduit. The first and second streams are merged into dispersion equipment in the presence any or all of an olefinic stabilizing agent and a coupling agent, each independently with the volatile base or neutralizing agent. These two agents can be added to either the first or second stream, or as a separate stream. A third stream including the aqueous phase (e.g., water) can be added downstream from the dispersion equipment. The flow rates of the streams are adjusted to achieve a dispersion having the desired amount of polymer phase and percent solids. The dispersion may further be cooled after exiting the dispersion equipment by the use of a suitable heat exchanger.

Suitable dispersion equipment can be any one of a number of continuous inline mixers, for example, an IKA high-shear mixer, Oakes rotor stator mixer, Ross mixer, Silverson mixer, continuous high shear mixer or centrifugal pump. The rotations-per-minute (rpm) setting of the disperser can be used to help control the particle size of the dispersed phase in the polyolefin dispersion. The system can be heated to provide the polymer and neutralizer components at a suitable viscosity for pumping. Steam formation is reduced by controlling the pressure through the use of a backpressure regulator, gear pump, metering pump, or other suitable device near the exit of the process.

Separately, an auxiliary polymer dispersion or emulsion may be used as a portion of the aqueous phase of the dispersion composition. Examples include, but are not limited to, acrylic, epoxy, polyester, polyurethane, polyolefin, polyamide and the like containing dispersions, emulsions, suspensions, colloidal suspensions.

The aqueous dispersion composition, e.g., the solid content thereof, can have an average volume particle size diameter in the range of from 100 to 2000 nanometers (nm), or up to 1750 nm, or, from 425 to 1800 nm, or, from 450 to 1750 nm.

During the preparation of a coating composition from the polyolefin dispersions of the present invention, any of the one or more fillers, extenders or pigments, one or more additives or auxiliary polymers, may be added to aqueous polyolefin dispersions after the dispersion formulation process.

The compositions of the present invention may be applied to the substrates variety of methods; for example, via roller coating, spray coating, powder coating, dip coating, electro deposition coating, printing, wash coating, flow coating, curtain coating.

The thicknesses of the resulting coating layer can range from 0.1 micrometer (µm) to 150 µm, for example, from 1 µm to an upper limit of 150 µm, 5 µm, or 25 µm. One or more coating layers may be applied to a substrate.

The compositions of the present invention can be applied to at least one surface of a metal substrate and then may be dried via a conventional drying method to form the coating layer at an oven set point temperature in the range of equal 100 to 375° C., or, preferably, from 170 to 260° C.

Curing temperature can be expressed in "peak metal temperature or (PMT)", meaning the actual temperature that the metal substrate with coating applied as it being cured in an oven that can be measured by a temperature recording device such as a Datapaq oven calibrator. The coating can be cured at PMT ranging from 100° C. to 260° C.

Drying and curing temperature is time and method dependent. Thus, at below 210° C. (PMT) curing in an oven may take from 1-50 min, or 4-15 min. In flash curing used applications such as coil coating the coating is cured at from 210-260° C. (PMT) for from 3 sec to 1 min.

The oven used could be a gas burning oven, electric oven, or induction oven. Furthermore, the oven can be a multi-zone oven that each zone temperature can be controlled independently and the dwell time can be different from zone to zone.

Suitable substrates may include, for example, metal substrates, e.g., aluminum, tin plated steel, tin free steel. Examples include metal, pretreated metal, such as anodized or phosphate pretreated metal. Substrates can be any used for food or beverage containers or aerosol containers.

Preferably, coatings are made in direct to metal coating applications and the coated metal can be used for food/beverage metal packaging.

EXAMPLES

The Examples that follow illustrate the present invention. Unless otherwise stated, in all of the Examples that follow, temperature is room temperature and pressure is atmospheric pressure.

TABLE 1

Raw Materials for Polyolefin Dispersions

| Trade Name | Supplier | Description/Chemical structure |
|---|---|---|
| Butyl CELLOSOLVE ™ | Dow[2] | Ethylene glycol mono-butyl ether |
| n-butanol | Dow[2] | n-butyl alcohol |
| Irganox ™ 1010 | BASF[1] | Pentaerythritol tetrakis(3-(3,5-di-tert-butyl-4-hydroxyphenyl)propionate) (CAS # 6683-19-8) |
| Irganox ™ 3114 | BASF[1] | 1,3,5-Tris[4-hydroxy-3,5-bis(2-methyl-2-propanyl)benzyl]-1,3,5- |

TABLE 1-continued

Raw Materials for Polyolefin Dispersions

| Trade Name | Supplier | Description/Chemical structure |
|---|---|---|
| Irganox™ 1330 | BASF[1] | triazinane-2,4,6-trione (CAS #27676-62-6) 1,3,5-Trimethyl-2,4,6-tris(3,5-di-tert-butyl-4-hydroxybenzyl)benzene (CAS # 1709-70-2) |
| Hostanox™ O3 | Clariant[1] | benzenepropanoic acid, 3-(1,1-dimethylethyl)-β-[3-(1,1-dimethylethyl)-4-hydroxyphenyl]-4-hydroxy-β-methyl-1,1'-(1,2-ethanediyl) ester (CAS #32509-66-3) |

[1]Leverkusen, DE;
[2]Midland, MI.

TABLE 1A

Raw Materials

| Material | Composition | Melting Point (° C.) | Melt Index | Density (g/cm³) | AN |
|---|---|---|---|---|---|
| Polyolefin base polymer 1 | ethylene/hexene-1 copolymer (CAS # 24213-02-9) | 129 | 44 | 0.95 | 0 |
| Polyolefin base polymer 2 | propylene-ethylene copolymer (CAS # 9010-79-1) with 800 ppm Irganox™ 3114 blended in | 145 | 35 | 0.9 | 0 |
| Polyolefin base polymer 3 or PP | propylene-ethylene copolymer (CAS# 9010-79-1) | 145 | 35 | 0.9 | 0 |
| Polyolefin base polymer 4 | 1-1.5% Maleic anhydride grafted polyethylene (CAS# 25213-02-9) | | 12 | 0.95 | 13 |
| Coupling agent 1 | 4-7% maleic anhydride grafted polypropylene | 130 | >1000 | — | 45 |
| Coupling agent 2 | 4-7% maleic anhydride grafted polyethylene (CAS# 9006-26-2) | 110 | >1000 | — | 45 |
| stabilizing agent | Ethylene Acrylic acid (21 mol. %) copolymer (CAS# 9010-77-9) | — | 0.96 | 300 | 155 |

Synthesis Examples: Polyolefin Dispersion Preparation

The solid composition of the prototype dispersions were kept the same, i.e., 70 wt. % polyolefin base polymer/22.5% olefinic stabilizing agent/7.5 wt % coupling agent. Acid functionality was neutralized with dimethylethanolamine (DMEA, Acros Organics, CAS 108-01-0) at 150% of theoretical based on carboxylic acid present (calculated as the weighted average value of the measured acid numbers of the individual ingredients in the polyolefin dispersion compositions). Unless otherwise indicated in Table 1, above, or Table 2, below, the total resin blend, including any masterbatches, was fed into a 25 mm diameter twin screw extruder by means of a controlled rate feeder where it was forwarded and melted. The extruder temperature profile was ramped up to approximately 160° C. prior to the addition of the initial water and DMEA, and subsequently, dilution water was added. The extruder speed was 1200 rpm. Amine neutralizing agent and water were mixed together and fed to the extruder at the initial water introduction point. The dilution water was fed via two separate pumps, and it was introduced at two locations into the dilution zone of the extruder. The initial water and dilution water streams were pre-heated to the extruder temperature. At the extruder outlet, a back-pressure regulator was used to adjust to a pressure of approximately 300 psig inside the extruder barrel to reduce steam formation at the operating temperature. The resulting dispersions were cooled and filtered through 800, 200 and 50 micron bag filters followed by a 20 micron cartridge filter. The various compositions for each composition are shown in Table 2, below.

TABLE 2

Dispersion Compositions

| Example | Resin composition (wt ratio) | Antioxidant and nominal loading (ppm on resin solids) | MEK double (cycles) |
|---|---|---|---|
| Comparative Example 1 | 70/22.5/7.5 Polyolefin base polymer 2/stabilizing agent/coupling agent 1 | 530 ppm Irganox™ 3114 in Polyolefin base polymer 2 | <25 |
| Comparative Example 3 | 70/22.5/7.5 Polyolefin base polymer 2/stabilizing agent/coupling agent 1 | 600 ppm Irganox™ 3114 post added plus 530 ppm Irganox 3114 in PP | 40 |
| Comparative Example 4 | 70/22.5/7.5 Polyolefin base polymer 2/stabilizing agent/coupling agent 1 | 600 ppm Irganox™ 1010 post added plus 530 ppm Irganox™ 3114 in PP | 85 |
| Comparative Example 5 | 70/22.5/7.5 PP/stabilizing agent/coupling agent 1 | 560 ppm Irganox™ 1010 dusted on PP | <25 |
| Comparative Example 2 | 70/22.5/7.5 PP/stabilizing agent/coupling agent 1 | 1100 ppm Irganox™ 1010 dusted on PP | 90 |
| Comparative Example 6 | 70/22.5/7.5 PP/stabilizing agent/coupling agent 1 | 600 ppm Hostanox™-O3 antioxidant post added plus 560 ppm Irganox™ 1010 dusted on PP | <25 |
| Comparative Example 7 | 70/22.5/7.5 PP/stabilizing agent/coupling agent 1 | 1000 ppm Hostanox-O3 antioxidant post added plus 560 ppm Irganox™1010 dusted on PP during dispersion | 65 |
| Example 1 | 70/22.5/7.5 PP/stabilizing agent/coupling agent 1 | 420 ppm Hostanox™ O3 melt blended in to dispersion through PP masterbatch | <25 |

TABLE 2-continued

Dispersion Compositions

| Example | Resin composition (wt ratio) | Antioxidant and nominal loading (ppm on resin solids) | MEK double (cycles) |
|---|---|---|---|
| Example 2 | 70/22.5/7.5 PP/stabilizing agent/coupling agent1 | 630 ppm Hostanox™ O3 melt blended in to dispersion through PP masterbatch | 185 |
| Example 3 | 70/22.5/7.5 PP/stabilizing agent/coupling agent 1 | 840 ppm Hostanox™ O3 melt blended into dispersion through PP masterbatch | 200 |
| Example 4 | 70/22.5/7.5 PP/stabilizing agent/coupling agent 1 | 530 ppm Hostanox™ O3 melt blended into dispersion through PP masterbatch + 530 ppm Irganox™ 3114 in PP resin | 200 |
| Example 5 | 64/7/22/7 Polyolefin base polymer 1/Polyolefin base polymer 4/stabilizing agent/coupling agent 2 | 640 ppm Hostanox™ O3 melt blended into dispersion through base polymer 1 masterbatch | 200 |
| Example 6 | 70/22.5/7.5 PP/stabilizing agent/coupling agent 1 | 420 ppm Hostanox™ O3 melt blended into dispersion through Masterbatch in coupling agent 1 | 200 |
| Comparative Example 8 | 70/22.5/7.5 PP/stabilizing agent/coupling agent 1 | 840 ppm Irganox™ 1010 melt blended into dispersion through PP masterbatch | <25 |
| Comparative Example 9 | 70/22.5/7.5 PP stabilizing agent/coupling agent 1 | 840 ppm Irganox™ 3114 melt blended into dispersion through PP masterbatch | <25 |
| Comparative Example 10 | 70/22.5/7.5 PP masterbatches/stabilizing agent/coupling agent 1 | 840 ppm Irganox™ 1330 melt blended into dispersion through PP masterbatch | <25 |

As shown in Table 2, above, master batches of polypropylene (PP) polyolefin base polymer with various indicated amounts of antioxidant loading were prepared by melt blending. The antioxidant containing PODs were prepared by combining the indicated amounts of antioxidant containing masterbatches. For example, to achieve a 600 ppm level of Hostanox™ O3 antioxidants (AO) and 750 ppm level of Irganox™ 3114 AO, a 7000 g PP pellet mixture was prepared consisting of 3500 g of a mix of 42.9% PP masterbatch with 50 ppm Hostanox™ O3 AO and 57.1% of PP masterbatch with 2060 ppm Hostanox™ O3 AO (masterbatches) and 3500 g of a mix of 23.4% PP masterbatch with 126 ppm Irganox™ 3114 AO and 76.6% PP masterbatch with 1920 ppm Irganox 3114 AO (masterbatches). To the pellet mixture was added 2250 g of a polyolefin stabilizing agent and 750 g of coupling agent 1. The pellet mixture was combined with a mechanical stirrer to uniformly distribute pellet component. Several of these 10 kg batches were prepared and were fed to the emulsification extruder to prepare the POD, as described above.

Antioxidant dispersions in polyolefins were melt blended or polyolefins having dusted on antioxidants were provided for making aqueous dispersion. Post addition of antioxidants was done by dissolving the indicated antioxidant in 1/1 butyl CELLOSOLVE/n-butanol mixture at 10 wt. % concentration and mixing the solution with dispersion without any further formulation steps.

Coating Preparation:

All coatings were applied to aluminum can body stock (X1178591212 clear aluminum can stock (All Foils Inc., Cleveland, Ohio) with a wire wound draw down bar to target a dry coating thickness of 7-10 microns. Coating curing was done at 225° C. for 4 minutes in a VWR 1640 forced air convection oven (VWR, Radnor, Pa.).

Test Methods:

MEK Double Rubs:

MEK double rub testing was performed according to ASTM D 5402-06 Method 3 (2011) 2011) on the coatings made according to the Coating preparation using bleached cheese cloth (Grade 50) having 28×24 threads per 2.54 cm×2.54 cm square and a 906 g (32 ounce) ball peen hammer, wherein the cloth was fastened with a wire to the flat end of the hammer and rubbed against the coating back and forth across the coating, the cloth being re-dipped into MEK every 25 double rubs. The cloth was repositioned to a fresh area or replaced after every panel. The number reported in Table 2, above is total number of back and forth rub cycles until the coating is cut through and the substrate becomes visible in any area. An acceptable MEK Double rub result is 100 rubs or higher.

As shown in Table 2, above, all coating compositions comprising masterbatches or antioxidant dispersions of hindered phenolic antioxidant containing an ester linkage in Examples 2 to 6 gave good MEK double rub results, indicating that the coatings formed therefrom had good thermal resistance. Example 1 did not have enough antioxidant when formed as an antioxidant dispersion in polypropylene. However, Example 6 gave excellent results with the same amount of hindered phenolic antioxidant dispersed as an antioxidant dispersion in a polymeric coupling agent. These examples indicate the preferred polymer for forming an antioxidant dispersion is a coupling agent or a polyolefin stabilizing agent having some water dispersibility and compatibility with the antioxidant. Example 4 indicates that the antioxidant dispersion can effectively comprise a second phenolic antioxidant not containing an ester linkage and lower the needed amount of the hindered phenolic antioxidant containing an ester linkage in the compositions. All of the Comparative Examples failed to include antioxidant dispersions, either as masterbatches or as dispersed in a polyolefin. In addition, the Comparatives 1, 8, 9 and 10 all failed in part because they failed to comprise a hindered phenolic antioxidant containing an ester linkage.

We claim:

1. A coating comprising a substrate having thereon one or more layers or films of a polyolefin dispersion composition comprising:
one or more polyolefin base polymers chosen from a polyolefin, a carboxylic acid functional polyolefin and a carboxylate functional polyolefin, from 1 to 40 wt. %, based on the total solids of the polyolefin dispersion composition, of one or more olefinic stabilizing agents having an acid number (AN) of from 80 to 250, from 0 to 50 wt. %, based on the total solids of the polyolefin dispersion composition, of one or more coupling agents having an acid number (AN) of from 10 to 70 and a having a melt index of from 500 to 5,000,000 grams of polymer melt passing in 10 minutes through a heated syringe or cylinder at 190° C. with a plunger loaded with 2.16 kg; and, dispersed in at least one of the one or more polyolefin base polymers, the one or more olefinic stabilizing agents which are polymers, or the one or more coupling agents which are polymers, at least one hindered phenolic antioxidant containing an ester linkage, wherein when having a thickness of 10 microns, the coating exhibits a methyl ethyl ketone double rub resistance of 100 double rubs or more until the coating is cut through and the substrate becomes visible in any area according to ASTM D 5402-06, Method 3 (2011), using bleached cheese cloth (Grade 50) having 28×24 threads per 2.54 cm×2.54 cm square and a 906 g (32 ounce) ball peen hammer, wherein the cloth is fastened with a wire to the flat end of the hammer and rubbed against the coating back and forth across the coating, the cloth being re-dipped into MEK every 25 double rubs.

2. The coating as claimed in claim 1, wherein the phenolic antioxidant containing an ester linkage comprises at least one hydroxyphenylpropionic acid ester or a combination thereof with one or more second antioxidants.

3. The coating as claimed in claim 2, wherein the phenolic antioxidant containing an ester linkage is benzenepropanoic acid, 3-(1,1-dimethylethyl)-β-[3-(1,1-dimethylethyl)-4-hydroxyphenyl]-4-hydroxy-β-methyl-1,1'-(1,2-ethanediyl) ester (CAS Registry No. 32509-66-3).

4. The coating as claimed in claim 1, wherein the total amount of hindered phenolic antioxidant containing an ester linkage ranges from 200 ppm to 10,000 ppm of total polyolefin dispersion composition solids.

5. The coating as claimed in claim 1, wherein the amount of the one or more olefinic stabilizing agents comprises an olefin-carboxylic acid copolymer or a blend of two such polymers.

6. The coating as claimed in claim 1, wherein the coating comprises from 2 to 30 wt. %, based on the total solids of the polyolefin dispersion composition, of the one or more coupling agents.

7. The coating as claimed in claim 1, wherein the one or more coupling agents is a maleic anhydride grafted polyolefin.

8. The coating as claimed in claim 1, wherein the one or more polyolefin base polymers comprises polyethylene, polypropylene, poly(alpha-olefin) copolymers, poly(alpha-olefin) terpolymers, or blends of any of these.

9. The coating as claimed in claim 1, wherein the substrate is a metal container, lid or closure for food or beverage.

10. A method of making a polyolefin dispersion composition for making the coating as claimed in claim 1 comprising:

(i) melt blending the hindered phenolic antioxidant containing an ester linkage, the one or more polyolefin base polymers, the one or more olefinic stabilizing agents and the one or more coupling agents, if any, or (ii) (a) melt blending the polyolefin base polymer, any coupling agent, and the olefinic stabilizing agent and (b), separately, melt blending the hindered phenolic antioxidant in any of a one or more polyolefin base polymers, one or more olefinic stabilizing agents, or one or more coupling agents to form an antioxidant dispersion; followed by dispersing the melt of (i) or a melt of both (ii) (a) and (b) in water along with a sufficient amount of one or more volatile base to neutralize from 50 to 300% of the carboxylic acid groups in the one or more polyolefin base polymers, the one or more olefinic stabilizing agents, and the one or more coupling agents to form the polyolefin dispersion composition.

11. An aqueous polyolefin dispersion composition comprising, as the dispersed phase, particles comprising:

one or more polyolefin base polymers chosen from a polyolefin, a carboxylic acid functional polyolefin and a carboxylate functional polyolefin;

from 1 to 40 wt. % based on the total solids of the aqueous polyolefin dispersion composition, of one or more olefinic stabilizing agents having an acid number (AN) of from 80 to 250;

from 0 to 50 wt. %, based on the total solids of the aqueous polyolefin dispersion composition, of one or more coupling agents having an acid number (AN) of from 10 to 70 and a having a melt index of from 500 to 5,000,000 grams of polymer melt passing in 10 minutes through a heated syringe or cylinder at 190° C. with a plunger loaded with 2.16 kg; and, dispersed in at least one of the one or more olefinic stabilizing agents, or the one or more coupling agents, at least one hindered phenolic antioxidant containing an ester linkage, wherein the phenolic antioxidant containing an ester linkage is benzenepropanoic acid, 3-(1,1-dimethylethyl)-β-[3-(1,1-dimethylethyl)-4-hydroxyphenyl]-4-hydroxy-β-methyl-1,1'-(1,2-ethanediyl) ester (CAS Registry No. 32509-66-3).

12. The aqueous polyolefin dispersion composition as claimed in claim 11, wherein the total amount of hindered phenolic antioxidant containing an ester linkage ranges from 200 ppm to 10,000 ppm of total aqueous polyolefin dispersion solids.

13. The aqueous polyolefin dispersion composition as claimed in claim 11, wherein the one or more olefinic stabilizing agents comprises an olefin-carboxylic acid copolymer or a blend of two such polymers.

14. The aqueous polyolefin dispersion composition as claimed in claim 11, wherein the dispersion comprises from 2 to 30 wt. %, based on the total solids of the aqueous polyolefin dispersion composition, of the one or more coupling agents.

15. The aqueous polyolefin dispersion composition as claimed in claim 11, wherein the one or more coupling agents is a maleic anhydride grafted polyolefin.

16. The aqueous polyolefin dispersion composition as claimed in claim 11, wherein the one or more polyolefin base polymers comprises polyethylene, polypropylene, poly(alpha-olefin) copolymers, poly(alpha-olefin) terpolymers, or blends of any of these.

17. A coating comprising a substrate having thereon one or more layers or films formed by:

applying the aqueous polyolefin dispersion composition of claim 11 to the substrate to form one or more coating layers; and drying the one or more coating layers to form the one or more layers or films.

* * * * *